May 9, 1950     H. A. FISCHLER     2,507,098

FISH LURE

Filed April 4, 1945

INVENTOR.
Harry A. Fischler,
BY W. Lee Helms
ATTORNEY

Patented May 9, 1950

2,507,098

UNITED STATES PATENT OFFICE 2,507,098

FISH LURE

Harry A. Fischler, Williamsport, Pa.

Application April 4, 1945, Serial No. 586,564

1 Claim. (Cl. 43—42.16)

The object of the invention is to provide a fish lure which will have a novel and realistic movement through the water as in trolling and line-casting with subsequent water drag of the lure, in that the lure will not only rotate so that a varying color effect plus movement will afford attraction, but it will transcribe a "dash-about" movement in a generally spiral bodily path during its rotation on a longitudinal axis.

The invention will be described with reference to the accompanying drawing, in which.

Figure 1:
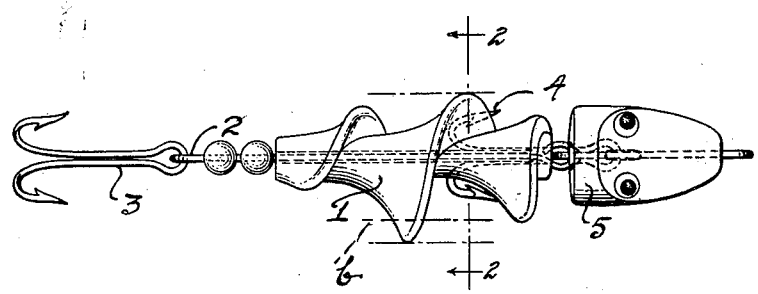
Fig. 1 is a plan view showing an embodiment of the invention, certain dotted lines indicating eccentricity of the spiral member forming the lure body.

Referring to the drawings, it will be seen that in the embodiment shown the lure consists of a body member 1 formed as a spiral and axially apertured to receive a rod or wire 2 which may be formed with an eye at its rear end to receive a hook or hooks 3, and additional hooks such as those indicated at 4 may be carried by the wire or rod, if desired. It will be understood that the spiral body member 1 will be mounted to freely rotate. The device may carry a head member 5 to simulate that of a small fish or other attractive lure and will be provided with means at the end of the head for attachment of the device to a fishing line.

Figure 2:
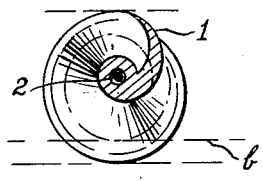
Fig. 2 is a transverse section on the line 2—2, Fig. 1.
Figure 3:
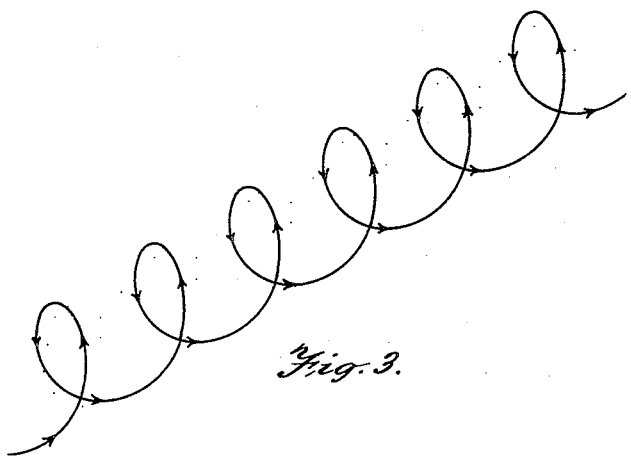
Fig. 3 is a schematic view showing the bodily path of movement of the lure as it rotates.

When the lure is drawn through the water, the spiral formation of its body will cause the latter to rotate. However, the spiral is at least in part eccentric to the longitudinal axis. The spiral formation includes a spiral convolution having an eccentric portion extending outwardly from the axis a distance greater than the convolution on each side thereof. A true concentric form would, looking at the device in transverse section, Fig. 2, be within the boundary indicated by the dotted line at $b$. The eccentric area lies outside of the dotted line at $b$ and is outwardly bounded by the full line. The result is that as the lure is drawn through the water it will rotate on its longitudinal axis and, in addition, will bodily move in a spiral path, as indicated somewhat schematically in Fig. 3.

By means of my invention a fish lure is provided which has added attractiveness because of its more natural movement.

Having described my invention, what I claim and desire to secure by Letters Patent, is as follows:

A fish lure comprising a front head member, a shaft-like member connected to the head for lateral swinging movements relatively thereto, and an elongated body mounted on said shaft for rotation thereon and lateral swinging motion relatively to the head, said body being provided with an exterior spiral formation rearwardly directed from the head and which includes a spiral convolution having an eccentric portion laterally extending with respect to the axis of the body and extending outwardly from the axis a distance greater than the convolution on each side thereof, the remaining portion of the spiral convolution being concentric with respect to the axis of the said body, said spiral formation being adapted to effect rotation and spiral path movement of the body when the head is connected to a fishing line and the structure drawn through a body of water.

HARRY A. FISCHLER.

REFERENCES CITED

The following references are of record in the file of this patent:

UNITED STATES PATENTS

| Number | Name | Date |
|---|---|---|
| 261,194 | Wylly | July 18, 1882 |
| 830,404 | Barnes | Sept. 4, 1906 |
| 1,691,225 | Clewell et al. | Nov. 13, 1928 |
| 1,701,528 | Clewell | Feb. 12, 1929 |
| 1,803,777 | Speich | May 5, 1931 |

FOREIGN PATENTS

| Number | Country | Date |
|---|---|---|
| 2,102 | Great Britain | of 1890 |
| 363,303 | Great Britain | Dec. 17, 1931 |